US011970386B2

(12) United States Patent
Godoy

(10) Patent No.: US 11,970,386 B2
(45) Date of Patent: Apr. 30, 2024

(54) EQUESTRIAN STIRRUP WITH RELEASABLE FOOT RETENTION

(71) Applicant: Joseph Godoy, Santee, CA (US)

(72) Inventor: Joseph Godoy, Santee, CA (US)

( * ) Notice: Subject to any disclaimer, the term of this patent is extended or adjusted under 35 U.S.C. 154(b) by 68 days.

(21) Appl. No.: 15/403,247

(22) Filed: Jan. 11, 2017

(65) Prior Publication Data

US 2018/0194612 A1 Jul. 12, 2018

(51) Int. Cl.
*B68C 3/00* (2006.01)

(52) U.S. Cl.
CPC .......... *B68C 3/00* (2013.01); *B68C 2003/005* (2013.01)

(58) Field of Classification Search
CPC .. B68C 3/00; B68C 3/02; B68C 3/016; B68C 3/025; B68C 2003/0008; B68C 2003/0025; B68C 2003/0033; B68C 2003/0041; B68C 2003/005; B68C 2003/0058; B68C 2003/0066; B68C 2003/0075; B68C 2003/0083; B68C 2003/0091
USPC ................................................ 54/47, 48, 49
See application file for complete search history.

(56) References Cited

U.S. PATENT DOCUMENTS 147,373 A * 2/1874 Crane ....................... B68C 3/00 54/48
475,127 A * 5/1892 Lotbiniere .............. B68C 3/025 54/48
545,796 A * 9/1895 Haddorf .................... B68C 3/02 54/49
D29,415 S * 9/1898 Bantz ........................... D30/142
D33,690 S * 12/1900 Goodman ......................... 54/47
895,291 A * 8/1908 Nagle ....................... B68C 3/02 54/49
1,020,752 A * 3/1912 Flora ......................... B68C 3/00 54/47
1,520,586 A * 12/1924 McCamis ................. B68C 3/02 54/49
5,172,538 A * 12/1992 Luger ....................... B68C 3/00 54/47
5,398,488 A * 3/1995 Brown ...................... B68C 3/00 54/47
5,709,070 A * 1/1998 Peters ....................... B68C 3/00 54/47
7,487,627 B2 2/2009 Godoy
2002/0162306 A1* 11/2002 Jones ........................ B68C 3/00 54/47
2007/0214753 A1* 9/2007 Godoy ...................... B68C 3/00 54/47
2014/0053516 A1* 2/2014 Harvey ..................... B68C 3/00 54/49

(Continued)

OTHER PUBLICATIONS

"Rubber Bands?". HorseForum.com. Post #5 Published Jun. 3, 2013. Accessed Jun. 10, 2018. <http://www.horseforum.com/barrel-racing/rubber-bands-205818/>.*

*Primary Examiner* — Joshua E Rodden
(74) *Attorney, Agent, or Firm* — SHIMOKAJI IP

(57) ABSTRACT

An equestrian stirrup with releasable foot retention has a foot rest with a top side for engagement with a rider's boot and a bottom side opposite the top side; At least one elastomeric-band attachment peg projects outwardly from the stirrup or from the bottom side of the foot rest. An elastomeric band has end portions for attachment to the at least one peg, and midsections for engaging with a front portion of a rider's boot.

5 Claims, 3 Drawing Sheets

(56) References Cited

U.S. PATENT DOCUMENTS

2015/0068168 A1* 3/2015 James ........................ B68C 3/00
54/47

* cited by examiner

EQUESTRIAN STIRRUP WITH RELEASABLE FOOT RETENTION

BACKGROUND OF THE INVENTION

The present invention relates to equestrian stirrups and more particularly stirrups configured to be held against a rider's feet.

During some equestrian activity, a rider may release downward foot pressure on a stirrup. For example, a rider may be engaged in competitive obstacle-course riding and rapid turning maneuvers may be accompanied by a rider lifting his or her leg in order to properly control his or body position during the maneuver. Under such conditions it is desirable to have the stirrup secured to the rider's boot so that the rider's foot does not become inadvertently disengaged from the stirrup.

Securing of a stirrup to a rider's boot has been practiced in the prior art. Typically, prior art stirrup securing systems have employed elastomeric bands being wrapped around a front part of the boot, passing under the stirrup and then being wrapped around a rear of the boot; for example on a spur. While the prior art system may be effective for retaining contact between a boot and a stirrup, the prior art system introduces potential risk of injury to the rider.

When the elastomeric band is wrapped around both a front and back of the boot, the band exerts a forward force on the boot driving it into the stirrup. This forward force is a hazardous condition for the rider. If the rider were to fall from a horse, the forward force exerted by the elastomeric band may prevent release of the rider's foot from the stirrup. Consequently, injury to the rider could result from such a failure to release.

As can be seen, there is a need for a system that may safely secure a stirrup to a rider's boot. More particularly, there is a need for such a system that will readily release the rider's foot from the stirrup if the rider falls from a horse.

SUMMARY OF THE INVENTION

In one aspect of the present invention, an equestrian stirrup comprises: at least one elastomeric-band attachment peg projecting outwardly from the stirrup.

In another aspect of the present invention, an equestrian stirrup with releasable foot retention comprises: a foot rest having, a top side for engagement with a rider's boot and a bottom side opposite the top side; at least one elastomeric-band attachment peg projecting from the bottom side of the foot rest; and an elastomeric band having; end portions for attachment to the at least one elastomeric-band attachment peg, and midsections for engaging with a front portion of a rider's boot.

In still another aspect of the present invention, a pair of equestrian stirrups comprise: a right-hand stirrup having, a right-hand foot rest; and a right-hand hanger support bar, wherein the right-hand hanger support bar is displaced laterally to the right relative to the right-hand foot rest; a left-hand stirrup having, a left-hand foot rest; and a left-hand hanger support bar, wherein the left-hand hanger support bar is displaced laterally to the left relative to the left-hand foot rest; and wherein the foot rests have, top sides for engagement with a rider's boots and bottom sides opposite the top sides; and at least one peg projecting from both of the bottom sides of the foot rest.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a stirrup with attachment pegs for holding an elastomeric band around a rider's boot to secure the stirrup to the boot. More particularly, the present invention provides such a stirrup in which only a front part of a rider's boot is secured to the stirrup.

Figure 1:
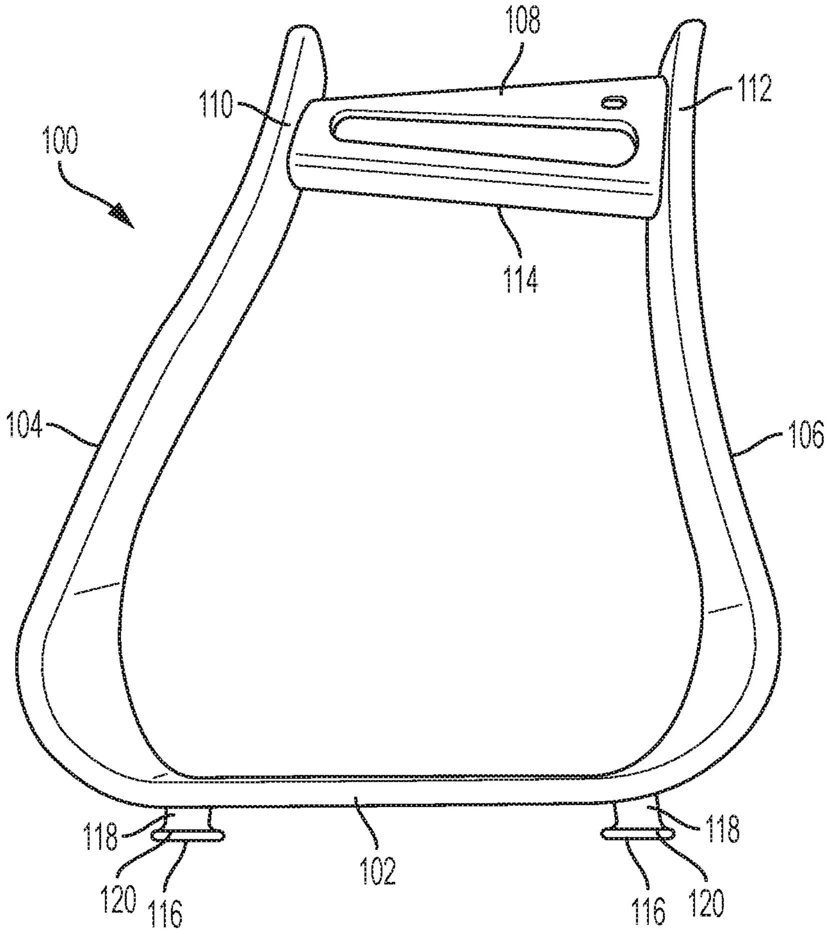
FIG. 1 is a plan view of a stirrup in accordance with an exemplary embodiment of the invention.

Turning now to the description and with reference first to FIG. 1, an exemplary embodiment of a stirrup 100 may comprise a foot rest 102, a first side member 104, a second side member 106 and a hanger support bar 108. The stirrup 100 shown in FIG. 1 is configured for a rider's right foot. It may be seen that, in the right-hand configuration, side members 104 and 106 are slanted to the right relative to the foot rest 102. A corresponding stirrup (not shown) may be configured for a rider's left foot. In that case, the side members (not shown) may be slanted to the left relative to the foot rest 102. In other words, a right-hand stirrup may have a right-hand hanger support bar displaced laterally to the right relative to a right-hand foot rest and a left-hand stirrup may have a left-hand hanger support bar displaced laterally to the left relative to a left-hand foot rest.

The hanger support bar 108 may have a longitudinal axis that is parallel to the foot rest 102. A bottom 114 of the hanger support bar 108 may be oriented at an angle with respect to the foot rest 102. Thus when the stirrup 100 is supported in leathers of a saddle (not shown), the foot rest 102 may be held in a horizontal attitude in the manner disclosed in U.S. Pat. No. 7,487,627, which patent is incorporated by reference herein in its entirety.

The hanger support bar 108 may have a first non-circular cross-sectional area at a point 110 where the hanger support bar 108 is joined to the first side member 104 and a second larger non-circular cross-sectional area at a point 112 where the hanger support bar 108 is joined to the second side member 106. Thus the hanger support bar 108 may have a tapered configuration. Advantageously, the tapered non-circular shape of the hanger support bar 108 may preclude excessive rotation of the stirrup 100 when attached to supporting leathers of a saddle. As a result, the stirrup 100 may be hobbled when in use.

The stirrup 100 may be provided with one or more pegs 116 projecting outwardly from the stirrup 100. In one exemplary embodiment, one or more of the pegs 116 may project downwardly from an underside of the foot rest 102. In another exemplary embodiment, the pegs 116 may project outwardly from sides of the foot rest 102 or outwardly from the side members 104 and/or 106.

In an exemplary embodiment the pegs 116 may comprise cylindrical bodies 118 having a first diameter and circular heads 120 having a second diameter greater the diameter of the bodies 118. In various alternative embodiments of the invention, the pegs 116 may have bodies 118 and heads 120 with non-circular cross-sections.

Figure 2:
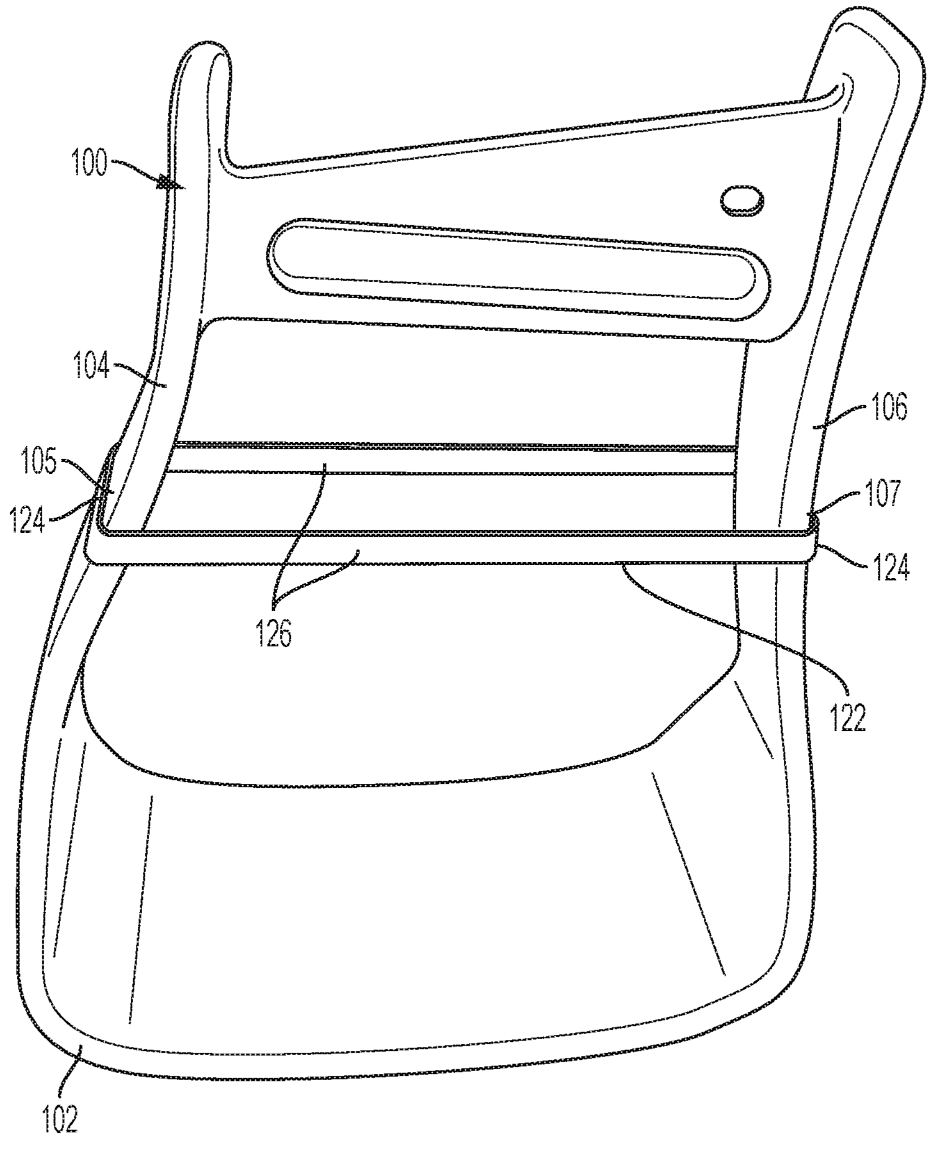
FIG. 2 is a perspective view of the stirrup of FIG. 1 in accordance with an exemplary embodiment of the invention.

Referring now to FIG. 2, it may be seen that an elastomeric band 122 (hereinafter the band 122) may be positioned on the stirrup 100 prior to a rider placing a foot into the stirrup. The band 122 may be positioned so that outer ends 124 are engaged with the side members 104 and 106. The side members 104 and 106 may have curved configurations such that an upper portion 105 of the side member 104 and an upper portion 107 of the side member 106 converge toward one another. The band 122 may be engaged with the upper portions 105 and 107 so that the midsections 126 of the band 122 may be positioned at a distance large enough so that a front portion of a rider's boot 128 (See FIG. 3) may fit between the midsections 126 and the foot rest 102. Advantageously, the above described curved configuration of the side members 104 and 106 may serve to hold the band 122 in the desired position prior to placement of a rider's boot 128 into the stirrup 100.

Figure 3:
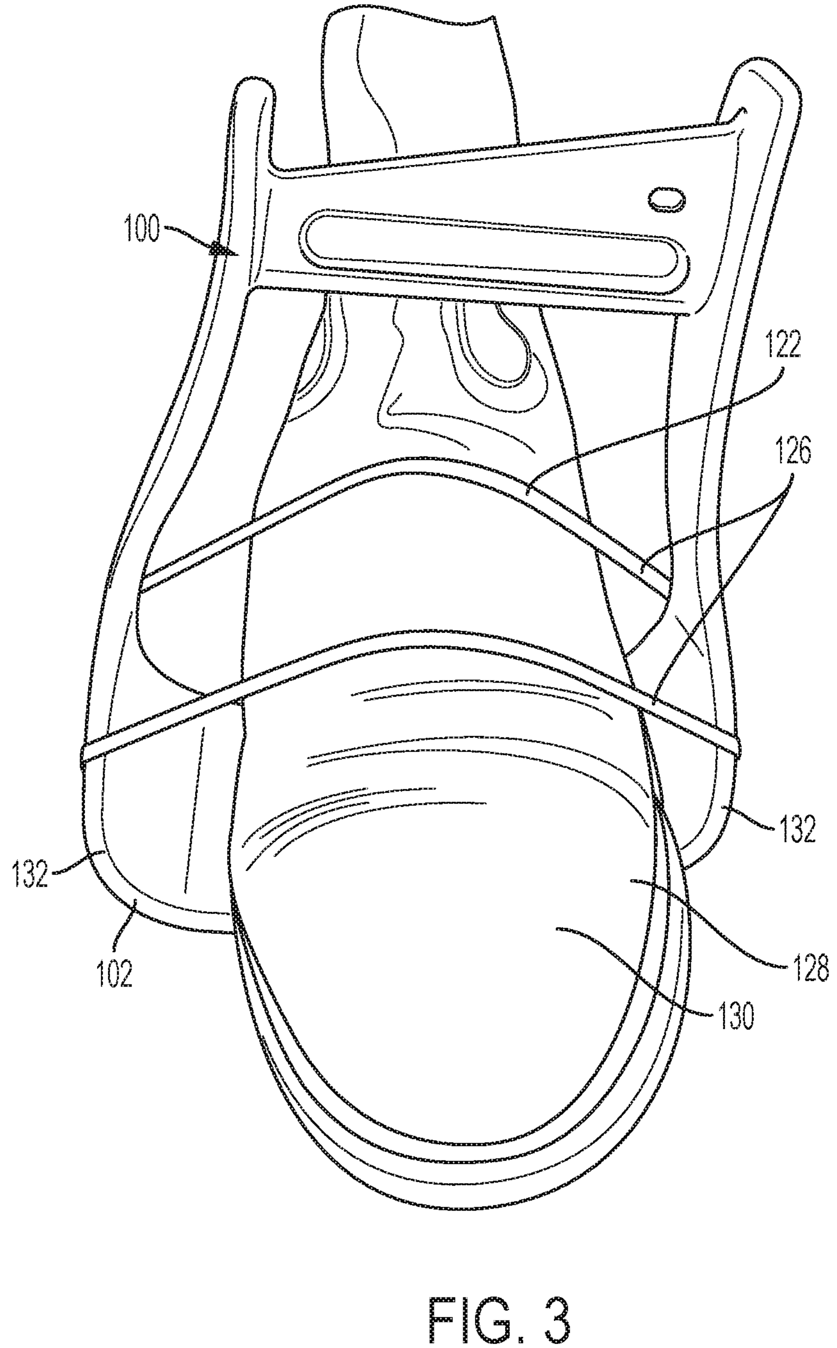
FIG. 3 is a perspective view of a rider's boot engaged with the stirrup of FIG. 1 in accordance with an exemplary embodiment of the invention.

Referring now to FIG. 3, it may be seen that a rider's boot 128 may be held in place against the foot rest 102 of the stirrup 100 when the band 122 is lowered into engagement with the front portion 130 of the boot 128. Each of the outer ends 124 of the band 122 may be wrapped around an outer portion 132 of the foot rest 102 and attached to one of the pegs 116 (See FIG. 1). It may be seen that the pegs 116 may be considered to be elastomeric-band attachment pegs 116 and may be so referred to herein.

In an alternate exemplary embodiment of the invention, the stirrup 100 may be provided with only a single peg 116 (not shown). In such an embodiment, both outer ends 124 of the band 122 may be attached to the single peg 116.

When a rider's boot 128 is in position in the stirrup 100 and the band 122 is engaged with the boot 128, only the front portion 130 of the boot 128 is held by the band 122. A back portion of the boot 128 may remain unconstrained by the band 122. Thus, unlike the prior art, a rider may readily move his or her foot back out of the stirrup 100 without encountering any resistance from the band 122. In that regard, the band 122 may not hinder or prevent removal of the rider's foot from the stirrup in the event of an accidental dismount from a horse.

It should be understood, of course, that the foregoing relates to exemplary embodiments of the invention and that modifications may be made without departing from the spirit and scope of the invention as set forth in the following claims.

I claim:

1. An equestrian stirrup with releasable foot retention comprising:
- a foot rest having,
  - a top side for engagement with a rider's boot and
  - a bottom side opposite the top side;
- a plurality of elastomeric-band attachment pegs projecting from the bottom side of the foot rest; and
- an elastomeric band having;
  - two end portions for attachment to the at least one peg, and
  - midsections for engaging with a front portion of the rider's boot;
  - wherein a first end portion of the two end portions of the elastomeric band is engaged with a first one of the elastomeric-band attachment pegs; and
  - wherein a second end portion of the two end portions of the elastomeric band is engaged with a second one of the elastomeric-band attachment pegs, so that the midsections of the elastomeric band hold the foot rest against the rider's boot when the rider's boot is positioned in the stirrup.

2. The stirrup of claim 1 further comprising:
- a first curved side member interconnecting a hanger support bar and the foot rest; and
- a second curved side member interconnecting the hanger support bar and the foot rest,
- wherein upper portions of the curved side members converge toward one another, and
- wherein the elastomeric band is engaged with the upper portions of the curved side members prior to the stirrup being engaged with the rider's boot.

3. A pair of equestrian stirrups comprising:
- a right-hand stirrup having,
  - a right-hand foot rest;
  - a right-hand hanger support bar,
  - wherein the right-hand hanger support bar is displaced laterally to the right relative to the right-hand foot rest;
- a left-hand stirrup having,
  - a left-hand foot rest;
  - a left-hand hanger support bar,
  - wherein the left-hand hanger support bar is displaced laterally to the left relative to the left-hand foot rest; and
- wherein the foot rests have,
  - top sides for engagement with a rider's boot and
  - bottom sides opposite the top side; and
  - a plurality of elastomeric-band attachment pegs projecting from each respective one of the bottom sides of the foot rest;
  - wherein first end portions of elastomeric bands are engaged with first ones of the pegs; and
  - wherein second end portions of the elastomeric bands are engaged with second ones of the pegs, so that midsections of the elastomeric bands hold the foot rests against the rider's boot when the rider's boot is positioned in the stirrups.

4. The pair of stirrups of claim 3 further comprising:
- the elastomeric bands being two elastomeric bands,
- wherein a first elastomeric band of the two elastomeric bands has;
  - the end portions for attachment to the plurality of elastomeric-band attachment pegs of the right-hand stirrup, and
  - the midsections for overlying a front portion of the rider's right boot, and
- wherein a second elastomeric band of the two elastomeric bands has;
  - the end portions for attachment to the plurality of pegs of the left-hand stirrup, and
  - the midsections for overlying a front portion of the rider's left boot.

5. The pair of stirrups of claim 4:

wherein both the right-hand and the left-hand stirrups have first curved side members interconnecting the respective hanger support bar and foot rest; and wherein both the right-hand and the left-hand stirrups have second curved side members interconnecting the respective hanger support bar and the foot rest, wherein upper portions of the curved side members of the right-hand stirrup converge toward one another, wherein upper portions of the curved side members of the left-hand stirrup converge toward one another and wherein the elastomeric bands are engaged with the upper portions of the curved side members prior to the stirrup being engaged with the rider's boots.

* * * * *